Patented Aug. 17, 1943

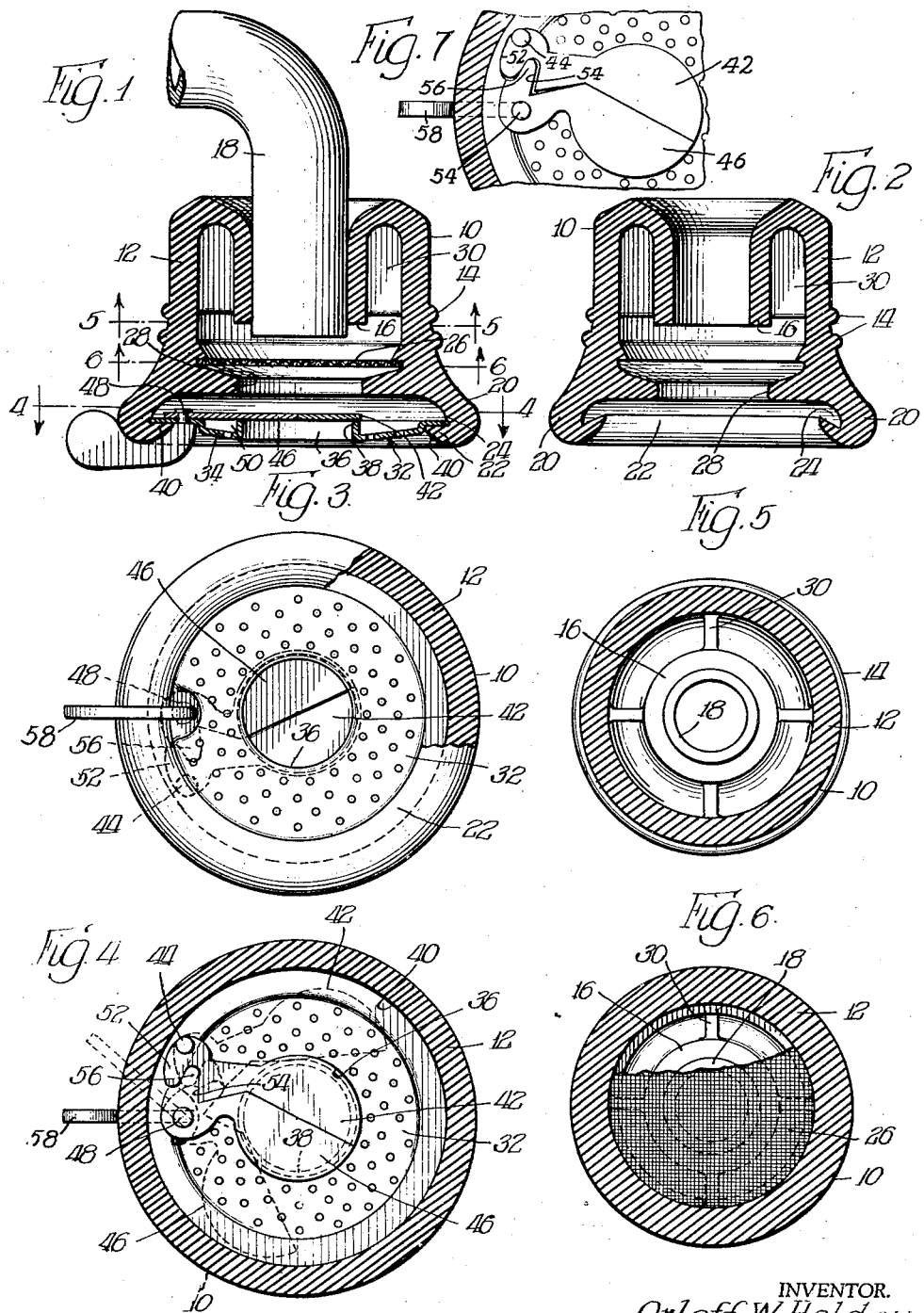

2,327,306

UNITED STATES PATENT OFFICE 2,327,306

FAUCET STRAINER

Orloff W. Holden, Chicago, Ill.

Application February 15, 1941, Serial No. 379,002

5 Claims. (Cl. 299—145)

The present invention relates to improvements in faucet strainers and more particularly to the type of strainer that permits a user a choice from the faucet of a spray or the ordinary flow.

Sprays of this type heretofore known and used are generally made from molded rubber having a cylindrical portion to be fitted over a faucet, and an annular spray disc intercepting the flow of water from the faucet, the disc having a central aperture adapted to be closed by a valve member or door to deflect the stream to the spray portion or to permit free flow of the stream through the aperture.

In these strainers it has been necessary to have the annular spray disc portion with a radial width at least equivalent to the diameter of the central aperture so that the valve door may be received at one side or the other of the aperture. The result is that faucet strainers have been of relatively large size, interfering with the use of the faucet in such occupations as dish washing and may tend to cause breakage of dishes, or injury to the hands in knocking thereagainst.

It is customary to use flat spray discs with the valve member sliding across the disc into open and closed position relative to the central aperture. When closed for spray purposes a portion of the valve member extends across the spray disc closing or obstructing some of the openings and preventing a smooth even spray flow through the area of the spray disc.

One object of the present invention is to provide a new faucet strainer that is economical to manufacture, is smaller than the usual strainer of this type and yet will give at least an equivalent or greater area of spray.

Another object is to provide a faucet strainer having a saving of material, and that is compact.

Another object is to provide a faucet strainer that, though more compact, will provide a wider more even spray than those heretofore known.

A further object is to provide a faucet strainer with an improved valve member that permits the use of a more compact structure throughout.

Various other objects will be apparent to those skilled in the art from an understanding of the invention as set forth hereinafter wherein one embodiment of the invention is shown in the drawing and described for purposes of exemplification.

In the drawing

Fig. 1 is a view in section through the faucet strainer showing it in place on a faucet;

Fig. 2 is a view in section similar to Fig. 1 showing the molded rubber housing with the strainer, spray and valve members removed;

Fig. 3 is a view of the faucet strainer from the bottom of Fig. 1;

Figs. 4, 5 and 6 are views taken on lines 4, 5 and 6 of Fig. 1, respectively; and Fig. 7 is a fragmentary illustration showing in detail and in closed position only, the opening closure structure of Fig. 4.

The present invention embodies a rubber housing so molded as to provide a gripping portion for a faucet outlet and proper seating facilities for various accessories useful in carrying out the objects of the present invention. The usual strainer for separating out foreign matter from the stream of liquid may be incorporated therein. A combination spray and free stream flow member is provided within the housing to intercept the stream flow from the faucet and is operated by a multipart swinging valve member permitting the use of a smaller spray member than has been used heretofore and a consequently smaller housing. The spray member conveniently may be annular in shape with a central free flow opening in axial alignment with the stream of liquid from the faucet. The radial width of the annular spray member may be substantially less than the free flow opening as it need be only sufficiently wide to receive and accommodate one-half of the double valve door member. Means are provided to space the valve member from the spray disc portion which may be channelled to provide an open annular spray chamber and may be angularly positioned to increase the width of the spray stream.

With reference to Figs. 1 and 2 it will be seen that a hollow housing 10 is provided of molded rubber having an outer substantially cylindrical body portion 12 provided with reinforcing ribs 14. The body portion may be turned inwardly at its top to form a re-entrant neck member 16 for gripping the outlet of a faucet 18.

At its lower portion the housing may be belled outwardly slightly as at 20 and turned upwardly and inwardly to provide a flexible resilient seating flange or lip member 22 to yieldingly support a spray disc and valve arrangement between the lip 22 and the curved portion of a domed wall 24.

Within the housing below the neck portion 16 a seat may be provided for a strainer 26 and a downwardly sloping annular baffle member 28 may be positioned therebeneath to direct water spread by the strainer back to a normally sized flow such as may be customarily received from the faucet 10. The neck portion 16 may be reinforced by spaced web members 30.

Seated within a lower chamber formed by the domed wall 24 and resiliently positioned and centered by the lip portion 22 is a stream flow controlling member generally designated as 32. This member includes an annular spray disc portion 34 arranged in a downwardly curved formation and having a centrally disposed free flow stream opening 36. While the spray portion may be considered curved as described, it may also be in the nature of an inverted truncated cone having an imaginary apex at substantially the axis of the opening 36. The spray portion has a plurality of small liquid passing apertures throughout its area causing liquid passing therethrough to be forced outwardly into a spray area substantially larger than the area of the spray portion itself, by reason of the centrally sloping portion 34.

At its inner edge around the opening 36 the member 32 is bent upwardly to form an annular collar 38 that guides the stream of water through the opening 36 with less tendency for the stream to splash sidewardly and drip through the spray apertures when a direct stream is desired. This collar also forms a seat or bearing member for the valve doors that open and close the opening 36 thereover. At its outer periphery the spray portion is stepped upwardly, and outwardly flanged to form a securing portion 40 adapted to be gripped between the lip 22 and the domed wall 24 of the housing as shown in Fig. 1. A valve door 42 is rotatably mounted adjacent one end to a stud or rivet 44 on the flange 40 and extends over the spray portion 34 in spaced relation thereto and has a seat on the annular collar 38 as shown in Fig. 1. A cooperating valve door 46 is rotatably mounted to a stud or rivet 48 that may extend upwardly from the spray portion 34 to a height corresponding to the stud 44 so that valve door 46 may be mounted in the same plane as the door 42 and extend across the spray portion 34 onto the collar 38 that also forms a seat therefor.

By the use of a plurality of valve doors 42 and 46, the opening 36 may be closed tightly, baffling a stream of liquid to the spray portion 34. To enable a stream of water to pass through the opening 36 without side splash, the width of the spray portion 34 and its holding flange 40 must be such as to permit the valve member to pass over them to completely clear the opening 36. Where a single door is used, the spray portion and supporting flange must be at least as wide as the opening 36. The plurality of doors herein shown makes it possible to reduce the width of the spray portion and flange to approximately one-half the diameter of the opening 36 with a consequent reduction in the size of the housing 12. There is thus a saving in the material of both the housing 12 and the flow controlling member 32.

As the valve doors 42 and 46 are mounted in spaced relation to the spray portion 34, an annular spray chamber or channel 50 is formed between the collar 38 and the stepped portion of the flange 40. The valve doors do not come in contact with the spray apertures and they are free and unobstructed throughout the area of the spray portion 34.

The valve doors 42 and 46 have interengaging cam members and a handle member for operating one door about its pivot to cause a cooperating cammed action of the other door for closing and opening the free flow passage 36. For instance as shown the valve door 42 has a curved hook portion 52 adjacent the pivot 44 and a cam shoulder 54. Valve door 46 has a tooth member 56 interfitting between the hook portion 52 and shoulder 54. An operating handle 58 is connected to door 46 so that door 46 may be swung from the full-line closed position to the open dotted line position as shown in Fig. 4. On this movement, the tooth 56 engages the shoulder 54 of door 42 and forces it from the full line closed position to the dotted line open position of Fig. 4. In closing, the tooth 56 bears against the inner face of the hook 52 to force the door 42 across the passage 36. The doors may be so designed, as shown, that they will abut each other across the passage 36 to prevent further closure movement.

As a limit in opening the valve doors the controlling member may be of such size that the domed wall 24 will afford a stop member for at least one of the doors while the abutting edges of the doors are still positioned on the collar or seat 38.

As may be seen best in Figs. 1 and 2, the lip portion 22 is turned up inwardly and is cut back sharply inwardly and downwardly to a junction with the domed wall 24 to form a seat for the flange 40. When the flange 40 is sprung into its seat, the lip 22 is distorted downwardly out of shape and tends to hold the controlling member snugly and yieldingly in place.

The upper edge of the annular collar 38 may be rounded to permit the swinging doors to ride over it more easily should one or the other be forced beyond the collar in opening the passage 36.

Various modifications of the structure will be apparent to those skilled in the art without departing from the spirit and scope of the invention. All such modifications are intended to be included within the scope of the appended claims.

I claim:

1. In a faucet strainer having a hollow housing for insertion over a faucet to permit a stream of liquid to pass therethrough, stream flow controlling means positioned in said housing across said stream, said controlling means including an annular spray portion having a free flow passage centrally thereof in axial alignment with said stream, cooperatively cammed swinging valve doors each extending over a part of said passage for closing said passage when said doors are in closed position, said doors each being pivotally mounted at one end in said controlling means, and an annular valve door seat and stream guide extending upwardly from the edge of said passage into cooperative position with said doors.

2. In a fluid flow device having a hollow body portion, the means mounted on said body portion for controlling the flow of fluid therethrough including a spray portion having a free flow opening therein, and closure means for said opening including a pair of operatively connected movable members having interconnected cammed portions, with movement of one of said members causing simultaneous movement of both of said members, with each of said members covering a part of said opening when in closed position and each extending over a part of said spray portion when in open position, and means supporting said members for said movement to open and closed positions.

3. In a liquid flow device having a body portion and spray means with an opening therein mounted on said body portion, the means for controlling the flow of liquid through said opening including a pair of closure members each having an edge with said edges abutting one another in closed position over the opening and each member covering a part of said opening in such closed position, axis means for each of said members on said spray means pivotally mounting said members thereon, each member having a cam portion adjacent its corresponding axis means with said cam portions interconnected, and operating means operatively connected with one of said members to move said members, and with said interconnected cam portions acting to move the other member therewith.

4. In a liquid flow device having a hollow body portion, the means for controlling the flow of liquid out of said body portion including a member having an annular spray portion and an opening centrally thereof, and multi-part means for closing said opening, with each of said parts covering a part of said opening in closed position thereof, interconnecting means for said multi-part means, means for movably mounting said multi-part means on said spray member at said interconnecting means, and operating means operatively connected to one of said multi-part means, and with all of said interconnected multi-part means movable upon movement of one of said multi-part means.

5. In a fluid flow device having a hollow body portion, the means for selectively providing a spray-like fluid flow from said body portion and a free fluid flow therefrom including in combination fluid passage means having a restricted flow portion and a non-restricted flow portion, movable multi-part closure means for said non-restricted flow portion having each part covering a portion of said non-restricted flow portion in closed position, interconnecting means for said multi-part closure means including cammed portions on at least two of said parts, and a finger-operated portion on one of said two parts to move said part and move the cammed portions thereby.

ORLOFF W. HOLDEN.